United States Patent
Fest et al.

[11] 3,892,753
[45] July 1, 1975

[54] O-ALKYL-O-[3-CYANO-QUINOLYL-(2)]-THIONOPHOSPHONIC ACID ESTERS

[75] Inventors: Christa Fest, Wuppertal; Ingeborg Hammann, Cologne, both of Germany

[73] Assignee: Bayer Aktiengesellschaft, Leverkusen, Germany

[22] Filed: July 24, 1973

[21] Appl. No.: 382,236

[30] Foreign Application Priority Data
Aug. 10, 1972 Germany............................ 2239366

[52] U.S. Cl.......... 260/283 CN; 260/283 P; 424/258
[51] Int. Cl.............................................. C07d 33/60
[58] Field of Search................... 260/283 P, 283 CN

[56] References Cited
UNITED STATES PATENTS

| | | | |
|---|---|---|---|
| 3,249,614 | 5/1966 | Young et al..................... | 260/283 P |
| 3,284,455 | 11/1966 | Fest et al.......................... | 260/283 P |
| 3,585,205 | 6/1971 | Schmidt et al.................. | 260/283 CN |

FOREIGN PATENTS OR APPLICATIONS

| | | | |
|---|---|---|---|
| 1,207,771 | 10/1974 | United Kingdom.......... | 260/283 CN |

*Primary Examiner*—Donald G. Daus
*Assistant Examiner*—David B. Springer
*Attorney, Agent, or Firm*—Burgess, Dinklage & Sprung

[57] ABSTRACT

O-alkyl-O-[3-cyano-auinolyl-(2)]-thionophosphonic acid esters of the formula

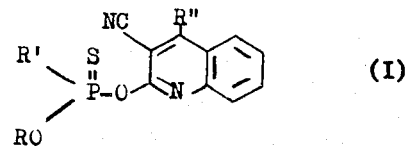

in which
R is lower alkyl,
R' is lower alkyl or phenyl, and
R'' is hydrogen or methyl, which possess insecticidal and acaricidal properties.

5 Claims, No Drawings

O-ALKYL-O-[3-CYANO-QUINOLYL-(2)]-THIONOPHOSPHONIC ACID ESTERS

The present invention relates to and has for its objects the provision of particular new O-alkyl-O-[3-cyano-quinolyl-(2)]-thionophosphonic acid esters, i.e. O-alkyl-O-[3-cyano-(optionally 4-methyl)-quinolyl-(2)]-alkyl- or -phenyl-thionophosphonic acid esters, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of thw within specification and accompanying examples.

It is known from German Published Specification DOS No. 1,670,823 that certain phosphorylated hydroxyquinoline derivatives, for example O-ethyl-O-[4-methylquinolinyl-(2)]-phenyl-thionophosphonic acid ester (Compound A), possess insecticidal and acaricidal properties.

The present invention provides, as new compounds, the quinoline-thionophosphonic acid esters of the general formula

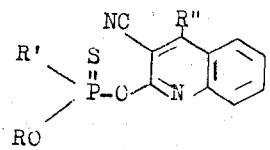

(I)

in which
R is lower alkyl,
R' is lower alkyl or phenyl, and
R'' is hydrogen or methyl.

Surprisingly, the quinoline-thionophosphonic acid esters (I) according to the invention possess a substantially better insecticidal and acaricidal action than prior-art compounds of analogous structure and of the same type of action. The new compounds thus represent a genuine enrichment of the art. Furthermore they contribute to meeting the great demand for new active compounds in the field of pesticides. This demand results from the fact that the commercially available agents are required to meet constantly higher standards — particularly with regard to questions of the protection of the environment — such as low toxicity to warm-blooded animals, low phytotoxicity, rapid degradation in and on the plant with minimum intervals to be observed between spraying with pesticides and harvesting, and activity against resistant pests.

Preferably R is straight-chain or branched alkyl of 1 to 4, especially 1 to 3 carbon atoms; and R' is straight-chain or branched alkyl of 1 to 4, especially 1 to 3, carbon atoms or phenyl.

The present invention also provides a process for the preparation of a quinoline-thionophosphonic acid ester of the formula (I) in which an hydroxyquinoline derivative of the general formula

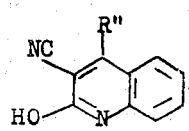

(III)

in which
R'' has the above-mentioned meaning,
is reacted in the form of an alkali metal, alkaline earth metal or ammonium salt therefor in the presence of an acid-binding agent, with a thionophosphonic acid ester halide of the general formula

(II)

in which
R and R' have the above-mentioned meanings, and
Hal is halogen, preferably chlorine.

If O-methyl-methane-thionophosphonic acid ester chloride and 2-hydroxy-3-cyano-quinoline are used as starting materials, the course of the reaction can be represented by the following equation

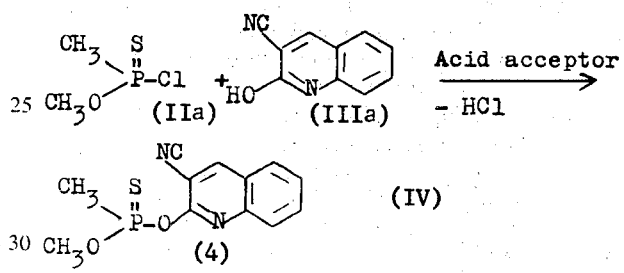

The following may be mentioned as examples of the thionophosphonic acid ester halides (II): O-methyl-, O-ethyl-, O-n-propyl- and O-isopropyl-phenyl-(or methane-, ethane- or propane-)thionophosphonic acid ester chlorides.

The thionophosphonic acid ester halides (II) to be used as starting materials are known and can easily be prepared according to conventional methods, as can the hydroxy-quinoline derivatives (III), for example 2-hydroxy-3-cyano-quinoline, which can be obtained, for example, by condensation of o-aminobenzaldehyde and cyanoacetic acid ester.

The process for the preparation of the new quinoline-thionophosphonic acid esters (I) is preferably carried out with conjoint use of a suitable solvent or diluent. Practically all inert solvents can be used for this purpose, especially aliphatic and aromatic, optionally chlorinated hydrocarbons, such as benzene, toluene, xylenes, benzine, methylene chloride, chloroform, carbon tetrachloride and chlorobenzene; ethers, for example diethyl ether, dibutyl ether and dioxane; ketones, such as acetone, methyl ethyl ketone, methyl isopropyl ketone and methyl isobutyl ketone; and nitriles, such as acetonitrile and propionitrile.

All customary acid-acceptors can be used as acid-binding agents. Compounds which have proved particularly suitable are alkali metal carbonates and alcoholates, such as sodium carbonate, methylate or ethylate and potassium carbonate, methylate or ethylate, as well as aliphatic, aromatic or heterocyclic amines, for example triethylamine, dimethylamine, dimethylaniline, dimethylbenzylamine and pyridine.

The reaction temperature can be varied within a fairly wide range. In general, the reaction is carried out at from 20° to 80°C, preferably from 35° to 55°C.

The reaction is generally carried out under normal pressure.

The starting materials are in most cases employed in equimolar amounts for carrying out the process. An excess of one or the other component produces no significant advantages. The reaction is preferably carried out in the presence of one of the above-mentioned solvents and, if required, in the presence of an acid acceptor, at the indicated temperatures, and after stirring for several hours, if necessary with warming, the reaction mixture is filtered, and water is added to the mixture, whereupon the reaction product precipitates; this is then worked up and purified in the usual manner.

The compounds according to the invention are obtained in a crystalline form and can be characterised by their melting points.

As has already been mentioned, the new quinoline-thionophosphonic acid esters are distinguished by excellent insecticidal and acaricidal activity against plant pests. They possess a good action against both sucking and biting insects and against mites (Acarina).

For these reasons, the compounds according to the invention may be successfully employed as pesticides, above all in plant protection.

To the sucking insects there belong, in the main, aphids (Aphididae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (Rhodnius prolixus) and Chagas' bug (*Triatoma infestans*) and, further cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), he Mediterranean flour moth (*Ephestia kuhniella*) and greater wax moth (*Galleria mellonella*).

Also to be classed with the biting insects are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprises essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) the bluebottle fly (*Calliphora erythrocephala*) as well as stable fly (*Stomoxys calcitrans*); further, gnats, for example mosquitoes such as the yellow fever mosquito (*Aedes aegypti*), the northern house mosquito (*Culex pipiens*) and the malaria mosquito (Anopheles stephensi).

With the mites (Acarina) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks such as the relapsing fever tick (*Ornithodorus moubata*).

When applied against pests harmful to health and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dipping, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Phaedon larvae test

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier, and the concentrate was diluted with water to the desired concentration.

Cabbage leaves (*Brassica oleracea*) were sprayed with the preparation of the active compound until dripping wet and then infested with mustard beetle larvae (*Phaedon cochleariae*).

After the specified periods of time, the degree of destruction was determined in %. 100% means that all beetle larvae were killed; 0% means that no beetle larvae were killed.

The active compounds, the concentrations of the active compounds, the times of evaluation and the results can be seen from the following Table 1:

Table 1

(Phaedon larvae test)

| Active compound | Active compound concentration in % | Degree of destruction in % after 3 days |
|---|---|---|
| (known) (A) — 4-methyl-quinolin-2-yl O-ethyl phenyl phosphonothioate | 0.1 | 0 |
| (3) — 3-cyano-quinolin-2-yl O-ethyl methyl phosphonothioate | 0.1<br>0.01<br>0.001 | 100<br>100<br>55 |
| (1) — 4-methyl-quinolin-2-yl O-ethyl phenyl phosphonothioate | 0.1<br>0.01 | 100<br>100 |
| (2) — 4-methyl-3-cyano-quinolin-2-yl O-ethyl phenyl phosphonothioate | 0.1<br>0.01 | 100<br>95 |

EXAMPLE 2

Plutella test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100% means that all the caterpillars were killed, whereas 0% means that none of the caterpillars were killed.

The active compounds, the concentrations of the active compounds, the evaluation times and the results can be seen from the following Table 2:

Table 2

(Plutella test)

| Active compound | Active compound concentration in % | Degree of destruction in % after 3 days |
|---|---|---|
| (known) (A) | 0.1<br>0.01 | 30<br>0 |
| (3) | 0.1<br>0.01<br>0.001 | 100<br>100<br>85 |
| (1) | 0.1<br>0.01 | 100<br>70 |

EXAMPLE 3

Myzus test (contact action)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*), which had been heavily infested with peach aphids (*Myzus persicae*), were sprayed with the preparation of the active compound until dripping wet.

After the specified periods of time, the degree of destruction was determined as a percentage: 100% means that all the aphids were killed, whereas 0% means that none of the aphids were killed.

The active compounds, the concentrations of the active compounds, the evaluation times and the results can be seen from the following Table 3:

Table 3

(*Myzus* test)

| Active compound | Active compound concentration in % | Degree of destruction in % after 3 days |
|---|---|---|
| 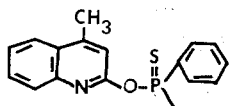 (known) (A) | 0.1 | 1 |
| 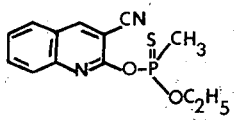 (3) | 0.1<br>0.01<br>0.001 | 100<br>100<br>60 |

EXAMPLE 4

Tetranychus test (resistant)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10–30 cm, were sprayed with the preparation of the active compound until dripping wet. These bean plants were then heavily infested with the two-spotted spider mite (*Tetranychus urticae*) in all stages of development.

After the specified periods of time, the effectiveness of the preparation of the active compound was determined by counting the dead mites. The degree of destruction thus obtained was expressed as a percentage: 100% means that all the spider mites were killed, whereas 0% means that none of the spider mites were killed.

The active compounds, the concentrations of the active compounds, the evaluation times and the results can be seen from the following Table 4:

Table 4

(*Tetranychus* test/resistant)

| Active compound | Active compound concentration in % | Degree of destruction in % after 3 days |
|---|---|---|
| 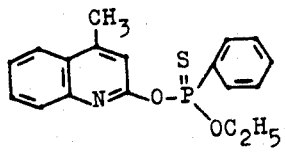 | 0.1 | 0 |

Table 4-Continued (*Tetranychus* test/resistant)

| Active compound | Active compound concentration in % | Degree of destruction in % after 3 days |
|---|---|---|
| (known) (A) 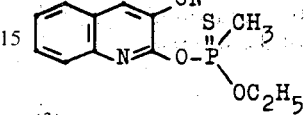 (3) | 0.1<br>0.01 | 98<br>70 |

The process of this invention is illustrated in the following preparative Example.

EXAMPLE 5

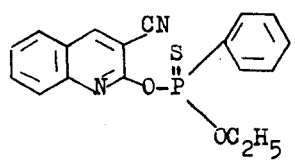  (1)

38 g (0.2 mole) of the sodium salt of 2-hydroxy-3-cyano-quinoline were suspended in 200 ml of acetonitrile and 44 g (0.2 mole) of 0-ethyl-phenyl-thionophosphonic acid ester chloride were added at about 40° to 50°C. The reaction mixture was warmed to 50°C for 4 hours and further stirred overnight at room temperature. The sodium chloride which had precipitated was thereafter filtered off and the filtrate was diluted with sufficient water for the ratio acetonitrile: water to be 1:2. 0-ethyl-0-[3-cyano-quinolyl-(2)]-phenyl-thionophosphonic acid ester thereupon precipitated. It was filtered off and after drying had a melting point of 98°C.

The following compounds were prepared by methods analogous to that described above.

| Formula | Melting point (°C) |
|---|---|
| 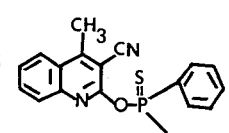 (2) | 114 |
| (3) | 124 |

Other compounds which may be similarly prepared include:

O-methyl-O-[3-cyano-4-methyl-quinolyl-(2)]-n-butyl-thionophosphonic acid ester,

O-isopropyl-O-[3-cyano-quinolyl-(2)]-isopropyl-thionophosphonic acid ester, and the like.

It will be appreciated that the instant specification and examples are set forth by way of illustration and not limitation, and that various modifications and changes may be made without departing from the spirit and scope of the present invention.

What is claimed is:

1. An O-alkyl-O-[3-cyano-quinolyl-(2)]-thionophosphonic acid ester of the formula

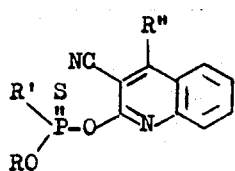

(I)

in which
R is alkyl of 1 to 4 carbon atoms,
R' is lower alkyl of 1 to 4 carbon atoms or phenyl, and
R'' is hydrogen or methyl.

2. An ester according to claim 1, in which R is alkyl of 1 to 3 carbon atoms; and R' is alkyl of 1 to 3 carbon atoms or phenyl.

3. An ester according to claim 1 wherein such ester is O-ethyl-O-[3-cyano-quinolyl-(2)]-phenyl-thionophosphonic acid ester of the formula

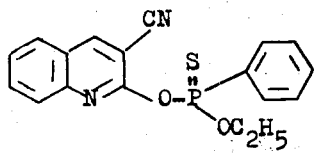

(1)

4. An ester according to claim 1, wherein such ester is O-ethyl-O-[3-cyano-4-methyl-quinolyl-(2)]-phenyl-thionophosphonic acid ester of the formula

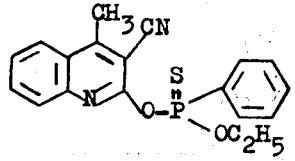

(2)

5. An ester according to claim 1, wherein such ester is O-ethyl-O-[3-cyano-quinolyl-(2)]-methyl-thionophosphonic acid ester of the formula

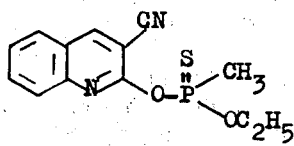

(3)

* * * * *

UNITED STATES PATENT OFFICE
CERTIFICATE OF CORRECTION

Patent No. 3,892,753         Dated July 1, 1975

Inventor(s) CHRISTA FEST ET AL.

It is certified that error appears in the above-identified patent and that said Letters Patent are hereby corrected as shown below:

Col. 9, Table 3, in the heading of last column of table, cancel "3 days" and substitute -- 1 day --.

Col. 9, Table 4, in the heading of last column of table, cancel "3 days" and substitute -- 8 days --.

Col. 10, Table 4 (cont'd), in the heading of last column of table, cancel "3 days" and substitute -- 8 days --.

Signed and Sealed this fourteenth Day of October 1975

[SEAL]

Attest:

RUTH C. MASON
Attesting Officer

C. MARSHALL DANN
Commissioner of Patents and Trademarks